US009846629B2

(12) United States Patent
De Schrijver et al.

(10) Patent No.: US 9,846,629 B2
(45) Date of Patent: *Dec. 19, 2017

(54) OBJECT STORAGE SYSTEM FOR AN UNRELIABLE STORAGE MEDIUM

(71) Applicant: AMPLIDATA NV, Lochristi (BE)

(72) Inventors: Frederik De Schrijver, Wenduine (BE); Romain Raymond Agnes Slootmaekers, Heverlee (BE); Bastiaan Stougie, Melle (BE); Joost Yervante Damad, Hulshout (BE); Wim De Wispelaere, Ghent (BE); Wouter Van Eetvelde, Sint-Amandsberg (BE); Bart De Vylder, Sinaai (BE)

(73) Assignee: Amplidata NV, Iochristi (BE)

( * ) Notice: Subject to any disclaimer, the term of this patent is extended or adjusted under 35 U.S.C. 154(b) by 72 days.

This patent is subject to a terminal disclaimer.

(21) Appl. No.: 14/811,690

(22) Filed: Jul. 28, 2015

(65) Prior Publication Data
US 2015/0331750 A1 Nov. 19, 2015

Related U.S. Application Data

(63) Continuation of application No. 14/154,442, filed on Jan. 14, 2014, now Pat. No. 9,135,136, which is a
(Continued)

(51) Int. Cl.
*G06F 17/30* (2006.01)
*G06F 3/06* (2006.01)
(Continued)

(52) U.S. Cl.
CPC ........ *G06F 11/3409* (2013.01); *G06F 3/0614* (2013.01); *G06F 11/1076* (2013.01);
(Continued)

(58) Field of Classification Search
CPC .............. G06F 11/3409; G06F 3/0614; G06F 17/30283; G06F 11/1076; G06F 11/2094; G06F 2211/1028; H04L 67/1097
(Continued)

(56) References Cited

U.S. PATENT DOCUMENTS 5,488,702 A * 1/1996 Byers .................. G06F 11/1004
714/807
5,555,391 A * 9/1996 De Subijana ....... G06F 12/0804
710/30
(Continued)

OTHER PUBLICATIONS

Jiyi et al., "Study on Redundant Strategies in Peer to Peer Cloud Storage Systems", International Journal of Applied Mathematics & Information Sciences, 5 (2) : pp. 235-242 (8 pages), 2011.*
(Continued)

*Primary Examiner* — Phuong Thao Cao
(74) *Attorney, Agent, or Firm* — Patent Law Works LLP

(57) ABSTRACT

A method and computer device for storage and retrieval of a data object on a storage medium. The method includes steps of disassembling the data object into a predetermined number of redundant sub blocks, storing the redundant sub blocks on the storage medium, retrieving at least a predetermined multiple of a minimal spreading requirement of the redundant sub blocks from the storage medium, and assembling the data object from any combination of a particular number of the redundant sub blocks, the particular number corresponding to a predetermined multiple of a minimal spreading requirement. The computer device includes modules for performing the steps.

20 Claims, 11 Drawing Sheets

Related U.S. Application Data continuation of application No. 13/976,061, filed as application No. PCT/EP2011/074035 on Dec. 23, 2011, now Pat. No. 8,738,582.

(60) Provisional application No. 61/427,330, filed on Dec. 27, 2010, provisional application No. 61/427,377, filed on Dec. 27, 2010.

(51) Int. Cl.
　　*G06F 11/34* (2006.01)
　　*H04L 29/08* (2006.01)
　　*G06F 11/10* (2006.01)
　　*G06F 11/20* (2006.01)

(52) U.S. Cl.
　　CPC .... *G06F 17/30283* (2013.01); *H04L 67/1097* (2013.01); *G06F 11/2094* (2013.01); *G06F 2211/1028* (2013.01)

(58) Field of Classification Search
　　USPC .......................................... 707/652
　　See application file for complete search history.

(56) References Cited

U.S. PATENT DOCUMENTS

| | | | | |
|---|---|---|---|---|
| 5,652,916 A * | 7/1997 | Murakami | ............ | G06F 9/4881 710/52 |
| 5,991,847 A * | 11/1999 | Ballard | ............... | G06F 12/0866 711/130 |
| 6,192,408 B1 * | 2/2001 | Vahalia | ............ | G06F 17/30171 707/E17.007 |
| 6,405,284 B1 | 6/2002 | Bridge | | |
| 6,490,666 B1 * | 12/2002 | Cabrera | ................ | G06F 12/123 707/999.202 |
| 7,529,834 B1 * | 5/2009 | Birrell | ................. | G06F 11/1464 707/999.1 |
| 7,536,693 B1 * | 5/2009 | Manczak | ................ | G06F 3/061 709/226 |
| 7,949,845 B2 * | 5/2011 | Sinclair | ............... | G06F 12/0246 711/103 |
| 8,370,294 B2 * | 2/2013 | Lyakhovitskiy | .. | G06F 17/30067 707/609 |
| 8,504,535 B1 * | 8/2013 | He | ................... | G06F 17/30902 707/695 |
| 8,874,523 B2 * | 10/2014 | Vickrey | ............ | G06F 17/30581 707/640 |
| 8,924,676 B1 * | 12/2014 | Anderson | ........... | G06F 12/0646 711/112 |
| 2003/0126247 A1 * | 7/2003 | Strasser | ............. | G06F 11/1458 709/223 |
| 2003/0188097 A1 | 10/2003 | Holland et al. | | |
| 2004/0210584 A1 * | 10/2004 | Nir | .......... | H04L 67/06 |
| 2006/0136507 A1 * | 6/2006 | Bangalore | ........... | G11C 16/102 |
| 2006/0161516 A1 * | 7/2006 | Clarke | ............. | G06F 17/30578 |
| 2006/0161585 A1 * | 7/2006 | Clarke | ............... | G06F 17/2288 |
| 2007/0288533 A1 * | 12/2007 | Srivastava | ........ | G06F 17/30215 |
| 2008/0313241 A1 | 12/2008 | Li et al. | | |
| 2009/0077261 A1 * | 3/2009 | Broadhurst | ............. | H04L 63/12 709/246 |
| 2009/0106395 A1 * | 4/2009 | Argov | ................ | H04B 7/18582 709/219 |
| 2009/0248886 A1 * | 10/2009 | Tan | ..................... | H04L 12/1836 709/231 |
| 2009/0265360 A1 * | 10/2009 | Bachwani | ............. | G06F 11/008 |
| 2010/0058023 A1 * | 3/2010 | Tan | ...................... | G06F 3/0605 711/202 |
| 2010/0115078 A1 * | 5/2010 | Ishikawa | ........... | G06F 17/30067 709/223 |
| 2011/0029840 A1 * | 2/2011 | Ozzie | .................. | G06F 11/1004 714/763 |
| 2011/0113282 A1 * | 5/2011 | De Spiegeleer | .... | G06F 11/1076 714/6.13 |
| 2011/0125771 A1 * | 5/2011 | Gladwin | ........... | G06F 17/30067 707/758 |
| 2011/0238859 A1 * | 9/2011 | Kitagata | ................ | G06Q 10/10 709/232 |
| 2011/0276538 A1 * | 11/2011 | Knapp | .................. | G06F 17/302 707/626 |
| 2011/0289100 A1 * | 11/2011 | Madhavarapu | ... | G06F 17/30286 707/769 |
| 2012/0023362 A1 * | 1/2012 | Kadhe | ....................... | G06F 3/06 714/6.3 |
| 2012/0033939 A1 * | 2/2012 | Murakami | ............... | H04N 5/76 386/239 |
| 2012/0166487 A1 * | 6/2012 | Stougie | ............... | G06F 11/1076 707/792 |
| 2013/0104175 A1 * | 4/2013 | Applegate | ........... | H04N 21/231 725/87 |
| 2013/0275381 A1 * | 10/2013 | De Schrijvr | ........ | G06F 11/1076 707/652 |

OTHER PUBLICATIONS

European Extended Search Report for EP Applciation No. 15185703.4, dated Feb. 5, 2016, 9 pages.

* cited by examiner

OBJECT STORAGE SYSTEM FOR AN UNRELIABLE STORAGE MEDIUM

REFERENCE TO CROSS-RELATED APPLICATIONS

This application is a continuation application of U.S. patent application Ser. No. 14/154,442 filed Jan. 14, 2014, now U.S. Pat. No. 9,135,136, titled "Object storage system for an unreliable storage medium", which is a continuation application of U.S. patent application Ser. No. 13/976,061 filed Jun. 26, 2013, now U.S. Pat. No. 8,738,582, titled "Distributed object storage system comprising performance optimizations", which is a 371 nationalization of Application No. PCT/EP2011/074035 filed Dec. 23, 2011, which is a non-provisional patent application claiming the priority benefit of U.S. Provisional Application Ser. No. 61/427,330, filed on Dec. 27, 2010 and U.S. Provisional Application Ser. No. 61/427,377 filed on Dec. 27, 2010 which applications are incorporated herein by reference in their entirety.

BACKGROUND OF THE INVENTION

1. The Field of the Invention

The present invention generally relates a distributed data storage system. Typically, such distributed storage systems are targeted at storing large amounts of data, such as objects or files in a distributed and fault tolerant manner with a predetermined level of redundancy. The present invention relates more particularly to a distributed object storage system.

2. The Related Technology

The advantages of object storage systems, which store data objects referenced by an object identifier versus file systems, such as for example US2002/0078244, which store files referenced by an inode or block based systems which store data blocks referenced by a block address in terms of scalability and flexibility are well known. Object storage systems in this way are able to surpass the maximum limits for storage capacity of file systems in a flexible way such that for example storage capacity can be added or removed in function of the needs, without degrading its performance as the system grows. This makes such object storage systems excellent candidates for large scale storage systems.

Such large scale storage systems are required to distribute the stored data objects in the object storage system over multiple storage elements, such as for example hard disks, or multiple components such as storage nodes comprising a plurality of such storage elements. However as the number of storage elements in such a distributed object storage system increase, equally the probability of failure of one or more of these storage elements increases. To cope therewith it is required to introduce a level of redundancy into the distributed object storage system. This means that the distributed object storage system must be able to cope with a failure of one or more storage elements without data loss. In its simplest form redundancy is achieved by replication, this means storing multiple copies of a data object on multiple storage elements of the distributed object storage system. In this way when one of the storage elements storing a copy of the data object fails, this data object can still be recovered from another storage element holding a copy. Several schemes for replication are known in the art. In general replication is costly as the storage capacity is concerned. This means that in order to survive two concurrent failures of a storage element of a distributed object storage system, at least two replica copies for each data object are required, which results in storage capacity overhead of 200%, which means that for storing 1 GB of data objects a storage capacity of 3 GB is required. Another well-known scheme is referred to as RAID systems of which some implementations are more efficient than replication as storage capacity overhead is concerned. However, often RAID systems require a form of synchronisation of the different storage elements and require them to be of the same type and in the case of drive failure require immediate replacement, followed by a costly and time consuming rebuild process. Therefor known systems based on replication or known RAID systems are generally not configured to survive more than two concurrent storage element failures. Therefor it has been proposed to use distributed object storage systems that are based on erasure encoding, such as for example described in WO2009135630 or US2007/0136525. Such a distributed object storage system stores the data object in encoded sub blocks that are spread amongst the storage elements in such a way that for example a concurrent failure of six storage elements out of minimum of sixteen storage elements can be tolerated with a corresponding storage overhead of 60%, that means that 1 GB of data objects only require a storage capacity of 1.6 GB.

Current erasure encoding based distributed object storage system for large scale data storage are well equipped to efficiently store and retrieve large data objects, however when small data objects need to be stored or retrieved, the latency generated by the encoding technology can become too large, especially if small data objects need to be stored in large quantities. The same holds for large data objects when only a smaller section of the data needs to be retrieved, because in traditional distributed object storage systems the data object can only be retrieved in its entirety and retrieval can only start after the data object was entirely stored.

Therefore, there still exists a need for a simple configuration facility that is able to cope with small data objects and data fragments of large data objects in a more efficient manner.

BRIEF SUMMARY OF SOME EXAMPLE EMBODIMENTS

According to a first aspect of the invention, there is provided a distributed object storage system which, according to a first storage and retrieval option, comprises:
  a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, which consists of the sum of:
    a minimal spreading requirement, corresponding to the minimal number of storage elements that must store sub blocks of said data object and are not allowed to fail; supplemented with
    a maximal concurrent failures tolerance, corresponding to the number of storage elements that must store sub blocks of said data object and are allowed to fail concurrently;
  each one of said redundant sub blocks comprising:
    encoded data of equal size of the data object divided by a factor equal to said predetermined multiple of said minimal spreading requirement; and
    decoding data, such that said data object can be decoded from any combination of said redundant sub blocks of which the number corresponds to predetermined multiple of said minimal spreading requirement;

a plurality of storage nodes each comprising a share of said plurality of redundant storage elements; and at least one controller node, operably connected to or comprised within said storage nodes when storing or retrieving said data object, comprising:

an encoding module operable to disassemble said data object into said predetermined number of redundant sub blocks;

a spreading module operable to store said predetermined number of said redundant sub blocks on a number of said storage elements being larger or equal to said desired spreading width;

a clustering module operable to retrieve at least said predetermined multiple of said minimal spreading requirement of said redundant sub blocks from a plurality of said storage elements; and a decoding module operable to assemble said data object from any combination of said redundant sub blocks of which the number corresponds to said predetermined multiple of said minimal spreading requirement,

CHARACTERIZED IN THAT according to a second storage and retrieval option of said distributed object storage system:

said plurality of redundant storage elements, are further operable to store and retrieve said data object comprising a data object identifier in the form of a predetermined plurality of replication copies of said data object comprising said data object identifier, said predetermined plurality corresponding to said desired spreading width, each one of said replication copies comprising an exact copy of said data object;

said encoding module is further operable to replicate said data object into said predetermined plurality of said replication copies;

said spreading module is further operable to store said predetermined plurality of said replication copies on a corresponding plurality of said storage elements;

said clustering module is further operable to retrieve at least one of said predetermined plurality of said replication copies from said corresponding plurality of said storage elements; and said decoding module is further operable to provide said data object from any one of said replication copies, and said distributed object storage system is operated according to said first storage and retrieval option if the size of said data object is equal to or larger than a predetermined lower data object size threshold, and is operated according to said second storage and retrieval option if the size of said data object is smaller then said predetermined lower data object size threshold.

This enables a distributed object storage system with a configuration that allows an increase in performance with regards to the storage of small data objects by a hybrid approach that differentiates the storage technology used on the basis of the size of the data object.

According to an embodiment said lower data object size threshold is 2 Megabyte or lower, preferably 1 Megabyte.

According to a further embodiment said plurality of redundant storage elements, each comprise a distributed key value store, and in that said replication copies are stored in said distributed key value store. This enables a simple mechanism for storing the replication copies aside from the sub blocks, which in some distributed object storage systems is already available.

Preferably said distributed key value store further comprises metadata of said data objects stored on said storage element, said metadata comprising:

said data object identifier;

a list of identifiers of the storage elements on which sub blocks or replication copies of said data object are stored; and an identifier for the type of storage and retrieval option that was used to store said data object.

Next to functioning as a suitable storage facility for small data objects, the key value store allows for a further performance optimization by means of its function as a metadata storage facility.

According to a further embodiment according to a third storage and retrieval option of said distributed object storage system:

said encoding module is further operable during a storage operation to split said data object into a plurality of sequential data objects of which the respective data object identifier comprises said data object identifier and a data object offset identifier, each of said sequential data objects subsequently being stored according to said first storage option;

said decoding module is further operable during a retrieval operation to concatenate said plurality of sequential data objects in the correct order by means of said respective data object offset identifier such that they form said data object, each of said sequential data objects previously being retrieved according to said first retrieval option.

said distributed object storage system is operated according to said third storage and retrieval option if the size of said data object is larger than a predetermined upper data object size threshold.

This allows still a further performance optimization of the storage and retrieval operation as also the approach for large data objects is differentiated in a way that allows for parallel processing of the requests.

Preferably, said upper data object size threshold is equal to or larger than 8 Megabyte, preferably equal to or larger than 32 Megabyte.

According to a preferred embodiment, according to said third storage and retrieval option of said distributed object storage system:

during a storage operation, a plurality said sequential data objects are being stored in parallel according to said first storage option; and during a retrieval operation, a plurality of said sequential data objects are being retrieved in parallel according to said first retrieval option.

Optionally according to said third storage and retrieval option of said distributed object storage system is operable to store and/or retrieve a specific selection of said sequential data objects by means of said data object offset identifier.

All the aforementioned embodiments allow for still a further performance optimization of the storage and retrieval operation.

According to still a further embodiment according to said first storage and retrieval option of said distributed object storage system:

said encoding module is further operable to generate a predetermined number of CRCs of said redundant sub blocks, when disassembling said data object into said predetermined number of redundant sub blocks;

said spreading module is further operable to store said predetermined number of CRCs together with their corresponding redundant sub blocks on said storage elements,

CHARACTERISED IN THAT said encoding module is operable to calculate said redundant sub block by means of a predetermined combination of XOR operations on intermediate data blocks, said encoding module is further operable to generate a CRC for each of said intermediate data blocks; and said encoding module is further operable to calculate said CRC of said redundant sub block by applying said predetermined combination of XOR operations to the respective CRCs of said intermediate data blocks.

In traditional systems, the CRC calculation would be performed fully on the concatenated dataset even when the CRCs on subsets of the dataset are known. As the CRC calculation is an expensive calculation, this requires additional CPU cycles, and this takes longer. The system according to the invention optimizes the calculation of a CRC by correctly combining the known CRC's of the subsets. This method results in less CPU cycles and thus a faster CRC calculation which even further optimizes the performance of the storage and retrieval operation.

According to an embodiment according to said first storage and retrieval option of said distributed object storage system:

said clustering module is further operable to retrieve said respective CRCs of said redundant sub blocks; and said decoding module is further operable to assemble said data object from intermediate data blocks which are generated from said redundant sub blocks by means of a predetermined combination of XOR operations; and said decoding module is further operable to calculate the CRC of said intermediate data blocks by applying said predetermined combination of XOR operations to the respective CRCs of said redundant sub blocks.

Optionally according to said first storage and retrieval option of said distributed object storage system:

said decoding module is further operable to form said data object from a concatenation of a plurality of said intermediate data blocks; and said decoding module is further operable to calculate the CRC of said data object from the CRCs of the respective intermediate data blocks.

According to a further optional embodiment according to said third storage and retrieval option of said distributed object storage system, said decoding module is further operable, during a retrieval operation, to calculate the CRC of said data object from the respective CRCs of said plurality of sequential data objects.

According to a second aspect of the invention there is provided an apparatus for storage or retrieval of a data object on a storage medium, which is unreliable, said storage medium,

CHARACTERISED IN THAT

Said apparatus is operable to store and retrieve on said storage medium a data object comprising a data object identifier in the form of a predetermined number of redundant sub blocks comprising said data object identifier, said predetermined number corresponding to a predetermined multiple of a desired spreading width, which consists of the sum of:

a minimal spreading requirement, which when multiplied with said predetermined multiple, corresponds to the minimal number of sub blocks of said data object which are not allowed to fail; supplemented with a maximal concurrent failures tolerance, which when multiplied with said predetermined multiple, corresponds to the number of sub blocks of said data object which are allowed to fail concurrently, each one of said redundant sub blocks comprising:

encoded data of equal size of the data object divided by a factor equal to said predetermined multiple of said minimal spreading requirement; and decoding data, such that said data object can be decoded from any combination of said redundant sub blocks of which the number corresponds to predetermined multiple of said minimal spreading requirement, said apparatus operably being connected to said storage medium when storing or retrieving said data object, comprising:

an encoding module operable to disassemble said data object into said predetermined number of redundant sub blocks;

a spreading module operable to store said predetermined number of said redundant sub blocks on said storage medium;

a clustering module operable to retrieve at least said predetermined multiple of said minimal spreading requirement of said redundant sub blocks from said storage medium; and a decoding module operable to assemble said data object from any combination of said redundant sub blocks of which the number corresponds to said predetermined multiple of said minimal spreading requirement.

According to an said embodiment said storage medium is segmented into at least said desired spreading width of different sections, said spreading module further being operable to store said predetermined number of said redundant sub blocks on a number of said sections of said storage medium being larger or equal to said desired spreading width, said clustering module further being operable to retrieve at least said predetermined multiple of said minimal spreading requirement of said redundant sub blocks from said sections of said storage medium.

This advantageously applies the teachings of a distributed object storage system in order to improve the robustness of an unreliable storage medium, in which optionally the storage medium can be segmented in different sections which will be treated as if they were virtual storage elements of a distributed object storage system.

DETAILED DESCRIPTION

Figure 1:
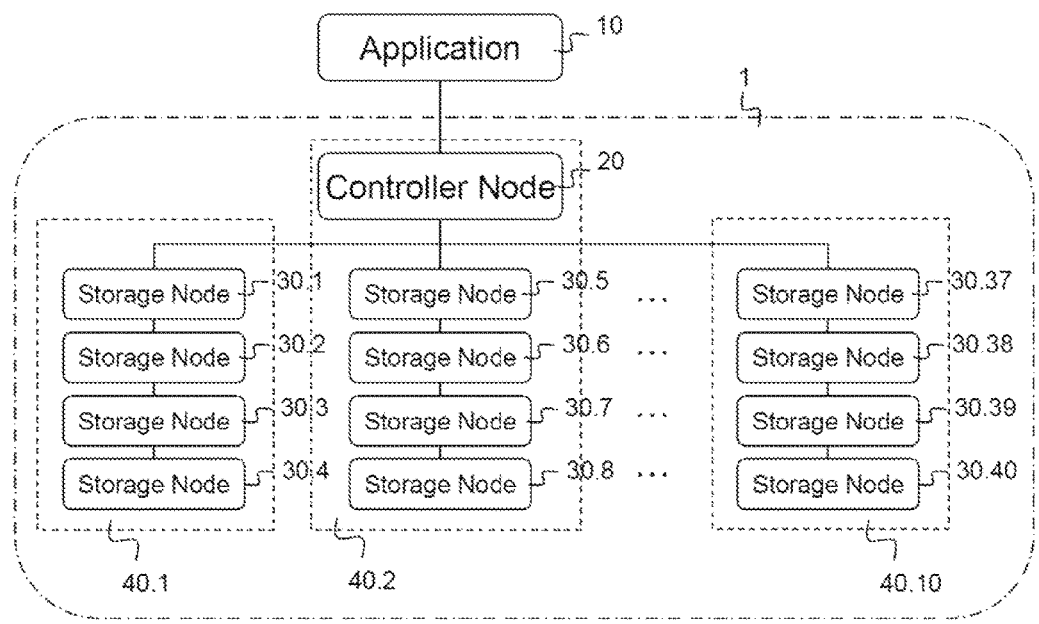
FIG. 1 illustrates a distributed object storage system according to the invention.

FIG. 1 shows a distributed object storage system 1 according to the invention. It is connected to an application 10 for transferring data objects. This connection could be implemented as a suitable data communication network. Such an application could for example be a dedicated software application running on a computing device, such as a personal computer, a lap top, a wireless telephone, a personal digital assistant or any other type of communication device, that is able to interface directly with the distributed object storage system 1, but said application 10 could alternatively comprise a suitable file system which enables a general purpose software application to interface with the distributed object storage system 1 or an Application Programming Interface library. As further shown in FIG. 1 the distributed object storage system comprises a controller node 20 and a plurality of storage nodes 30.1-30.40 all interconnected in a suitable way for transferring data, for example by means of a conventional data communication network such as a local area network (LAN), a wide area network (WAN), a telephone network, such as the Public Switched Telephone Network (PSTN), an intranet, the internet, any other suitable network or combination of networks. Controller nodes 20, storage nodes 30 and the device comprising application 10 may connect to said data communication network by wired, wireless and/or optical connections.

According to alternative embodiments of the distributed object storage system could comprise any other suitable number of storage nodes 30 and for example two three or more controller nodes 20 also connected to these storage nodes 20. These controller nodes 20 and storage nodes 30 can be built as general purpose computers, however more frequently they are physically adapted for arrangement in large data centres, where they are arranged in modular racks 40 comprising standard dimensions. Particular controller nodes 20 and storage nodes 30, such as for example the Amplistor AS20 storage node as manufactured by Amplidata, are dimensioned to take up a single unit of such rack 40, which is generally referred to as 1 U.

As shown in FIG. 1 several storage nodes 30 can be grouped together, for example because they are housed in a single rack 40. For example storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
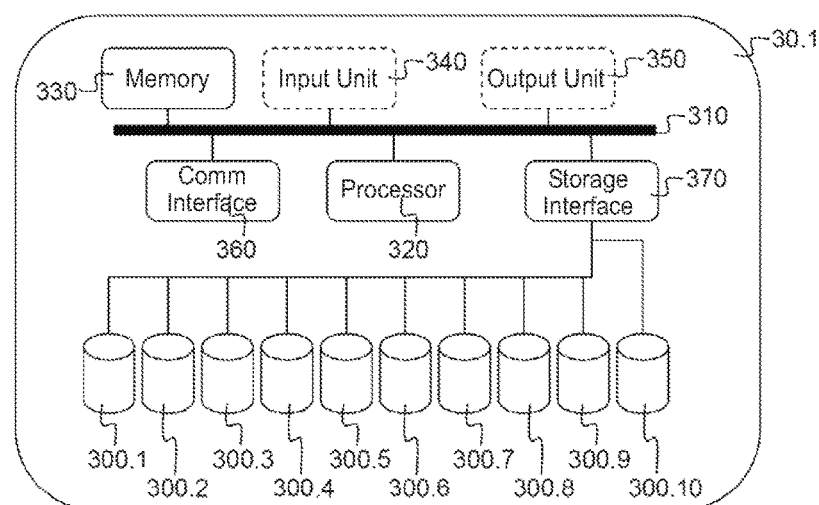
FIG. 2 schematically illustrates a storage node of the distributed object storage system of FIG. 1.

FIG. 2 shows a schematic representation of one of the storage nodes 30. Storage node 30.1 may comprise a bus 310, a processor 320, a local memory 330, one or more optional input units 340, one or more optional output units 350, a communication interface 360, a storage element interface 370 and a plurality of storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for 2 TB SATA-II disk drives, and control the reading and writing of data to/from these storage elements 300. In one exemplary embodiment as shown in FIG. 2, such a storage node 30.1 could comprise ten 2 TB SATA-II disk drives as storage elements 300.1-300.10 and in this way storage node 30.1 would provide a storage capacity of 20 TB to the distributed object storage system 1. According to the exemplary embodiment of FIG. 1 and in the event that storage nodes 30.2-30.40 are identical to storage node 30.1, the distributed object storages system 1 would then have a total storage capacity of 800 TB.

Taking into account FIGS. 1 and 2 the distributed object storage system 1 comprises a plurality of redundant storage elements 300. The storage nodes 30 each comprise a share of these storage elements 300. As shown in FIG. 1 storage node 30.1 comprises ten storage elements 300.1-300.10. Other storage nodes 30 could comprise a similar amount of storage elements, but this is however not essential. Storage node 30.2 could for example comprise eight storage elements 300.11-300.18. As will be explained in further detail below with respect to FIGS. 5 and 6, the distributed object storages system 1 is operable to store and retrieve a data object 500 comprising data 520, for example 64 MB of binary data and a data object identifier 510 for addressing this data object 500, for example a universally unique identifier such as a globally unique identifier (GUID). Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function can easily be taken on by another storage element 300 in the distributed storage system. However as will be explained in more detail further below, there is no need for the storage elements 300 to work in synchronism, as is for example the case in many well-known RAID configurations, which sometimes even require disc spindle rotation to be synchronised. Furthermore the independent and redundant operation of the storage elements 300 allows to use any suitable mix of types storage elements 300 to be used in a particular distributed object storage system 1. It is possible to use for example storage elements with differing storage capacity, storage elements of differing manufacturers, using different hardware technology such as for example conventional hard disks and solid state storage elements, using different storage interfaces such as for example different revisions of SATA, PATA and so on. All this results in specific advantages for scalability and flexibility of the distributed object storage system 1 as it allows to add or remove storage elements 300 without imposing specific requirements to their design in correlation to other storage elements 300 already in use in that distributed object storage system 1.

Figure 3:
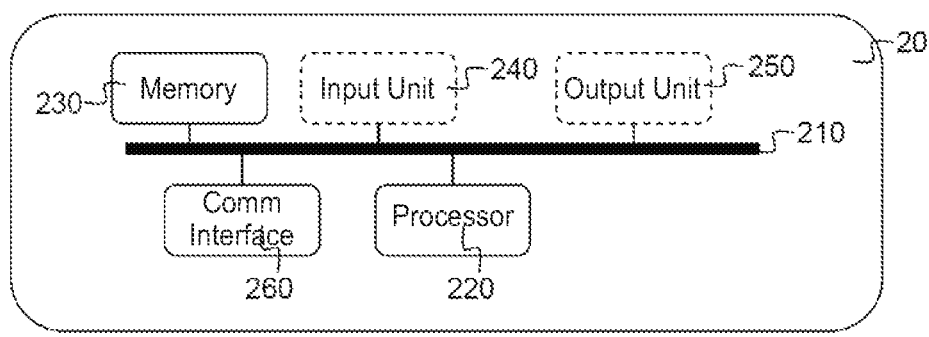
FIG. 3 schematically illustrates a controller node of the distributed object storage system of FIG. 1.

FIG. 3 shows a schematic representation of the controller nodes 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to said controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still a further embodiment the device on which the application 10 runs is a controller node 30.

Figure 4:
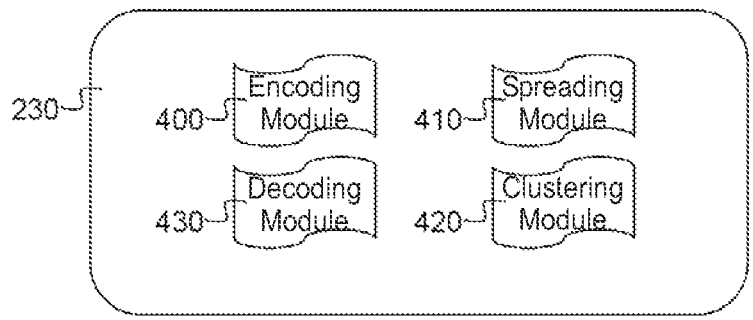
FIG. 4 schematically illustrates some elements of the controller node of FIG. 3 in more detail.

As schematically shown in FIG. 4, controller node 20 comprises four modules: an encoding module 400; a spreading module 410; a clustering module 420; and a decoding module 430. These modules 400, 410, 420, 430 can be implemented as programming instructions stored in local memory 230 of the controller node 20 for execution by its processor 220.

The functioning of these modules 400, 410, 420, 430 will now be explained to FIGS. 5 and 6. The distributed object storage system 1 stores a data object 500 offered by the application 10 in function of a reliability policy which guarantees a level of redundancy. That means that the distributed object storage system 1 must for example guarantee that it will be able to correctly retrieve data object 500 even if a number of storage elements 300 would be unavailable, for example because they are damaged or inaccessible. Such a reliability policy could for example require the distributed object storage system 1 to be able to retrieve the data object 500 in case of six concurrent failures of the storage elements 300 it comprises. In large scale data storage massive amounts of data are stored on storage elements 300 that are individually unreliable, as such redundancy must be introduced into the storage system to improve reliability. However the most commonly used form of redundancy, straightforward replication of the data on multiple storage elements 300 is only able to achieve acceptable levels of reliability at the cost of unacceptable levels of overhead. For example, in order to achieve sufficient redundancy to cope with six concurrent failures of storage elements 300, data objects 500 would need to be replicated six times and stored on redundant storage elements 300. This means that next to the master copy of a data object 500 stored on one storage element 300, six replica's must be stored on six other storage elements. As such storing 1 GB of data objects in this way would result in the need of 7 GB of storage capacity in a distributed object storage system, this means an increase in the storage cost by a factor of seven or an additional storage overhead of 600%. Therefor the distributed object storage system 1 according to the invention makes use of erasure coding techniques in order to achieve the requirements of the reliability policy with considerably less storage overhead. As will be explained in further detail below when using an erasure encoding with a rate of encoding r=10/16 six concurrent failures of storage element 300 can be tolerated, which only require a storage overhead of 60% or a storage cost by a factor of 1.6. This means that storing 1 GB of data objects in this way only results in the need of 1.6 GB of storage capacity in the distributed object storage system 1. Some erasure encoding techniques make use of Reed-Solomon codes, but also fountain codes or rateless erasure codes such as online codes, LDPC codes, raptor codes and numerous other coding schemes are available.

Figure 5:
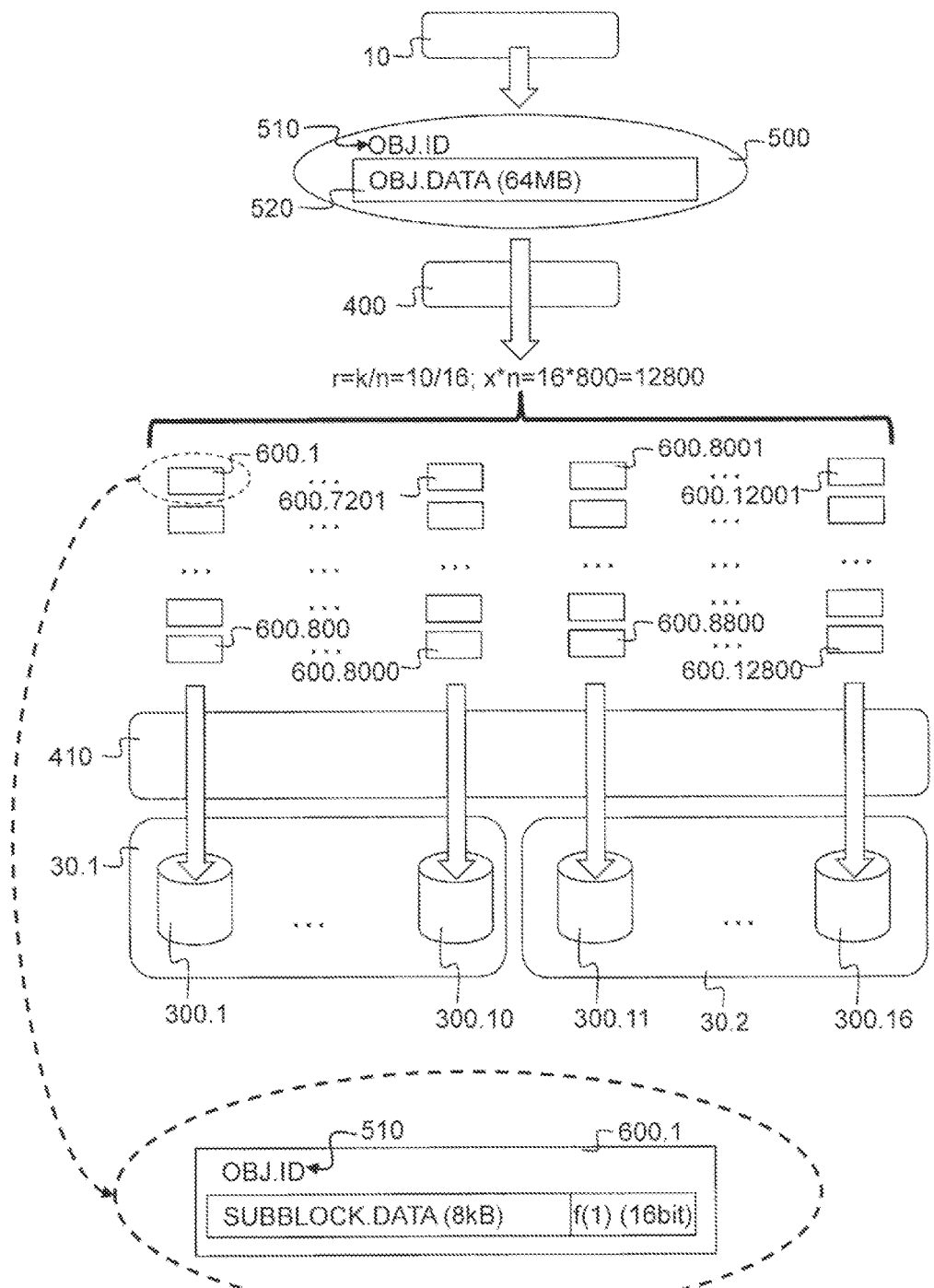
FIG. 5 schematically illustrates a storage operation according to the first option.

FIG. 5 shows a storage operation according to a first storage and retrieval option performed by an embodiment of the distributed object storage system 1 that is able to tolerate six concurrent failures of a storage element 300. The data object 500 is offered to the distributed object storage system 1 by the application 10 requesting a storage operation. In this embodiment the data object 500 comprises an object identifier 510, such as for example a GUID, and object data 520, for example consisting of 64 MB of binary data. This data object 500 is offered to the encoding module 400 of the controller node 20. The encoder module 400 will disassemble the data object 500 into a predetermined number x*n=16*800=12800 of redundant sub blocks 600, which also comprise the data object identifier 510. This predetermined number x*n=16*800=12800 corresponds to a predetermined multiple x=800 of a desired spreading width n=16. This desired spreading width n=16=k+f=10+6 consists of the sum of a minimal spreading requirement k=10 and a maximal concurrent failures tolerance f=6. This maximal concurrent failures tolerance f=6 corresponds to the number of storage elements 300 that store sub blocks 600 of said data object 500 and are allowed to fail concurrently as determined by the reliability policy. The minimal spreading requirement k=10, corresponds to the minimal number of storage elements 300 that must store sub blocks 600 of said data object 500 and are not allowed to fail. The encoder module 400 makes use of an erasure encoding scheme to produce these predetermined number x*n=16*800=12800 redundant sub blocks 600.1-600.12800. In this way each one of these redundant sub blocks 600, such as for example sub block 600.1 comprises encoded data of equal size of the data object 500 divided by a factor equal to said predetermined multiple of said minimal spreading requirement x*k=800*10=8000. This means that the size of sub block 600.1 in the example above with a data object of 64 MB will be 8 kB, as this corresponds to 64 MB divided by x*k=800*10=8000. Sub block 600.1 will further comprise decoding data f(1), such that said data object 500 can be decoded from any combination of said redundant sub blocks 600 of which the number x*k=800*10=8000 corresponds to said predetermined multiple x=800 of said minimal spreading requirement k=10. To accomplish this the encoder module 400 will preferably make use of an erasure encoding scheme with a rate of encoding r=k/n=10/16 which corresponds to the minimal spreading requirement k=10 divided by the desired spreading width n=16. In practice this means that the encoder module 400 will first split the data object 500 of 64 MB into x*k=800*10=8000 chunks of 8 kB, subsequently using an erasure encoding scheme with a rate of encoding of r=k/n=10/16 it will generate x*n=800*16=12800 encoded redundant sub blocks 600.1-600.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the sub block 600, such as for example a suitable sub block identifier. Because of the erasure encoding scheme used, namely a rate of encoding r=k/n=10/16, the sub blocks 600.1-600.12800 allow the data object 500 to be decoded from any combination of sub blocks 600 which corresponds to the predetermined multiple of the minimal spreading requirement x*k=800*10=8000, such as for example the combination of sub blocks 600.1-600.4000 and sub blocks 600.8001-600.12000. The storage cost of such an erasure coding scheme is inversely proportional to the rate of encoding and in this particular embodiment will be a factor of 1/r=1/(10/16)=1.6. This means that according to this embodiment of the distributed object storage system 1 of the invention 1 GB of data objects 500 will result in a need for a storage capacity of 1.6 GB.

Subsequently, as shown in FIG. 5, the spreading module 410 will store the predetermined number x*n=800*16=12800 of encoded redundant sub blocks 600.1-600.12800 on a number of storage elements 300 which corresponds to said desired spreading width n=16, such as for example storage elements 300.1-300.16. The spreading module 410 will store on each of these storage elements 300.1-300.16 said predetermined multiple x=800 of these sub blocks 600. As shown in FIG. 5 sub blocks 600.1-600.800 are stored on storage element 300.1, the next x=800 of these sub blocks are stored on storage element 300.2 and so on until the last x=800 of these sub blocks 12001-12800 are stored on storage element 300.16. As shown in FIG. 5 storage elements 300.1-300.10 are arranged in storage node 30.1 and storage elements 300.11-300.16 are arranged in storage node 30.2.

According to an alternative embodiment the sub blocks could be spread by the spreading module 410 on a number of storage elements 300 which is larger than said desired spreading width n=16, for example n+1=16+1=17 storage elements 300. This could be implemented by for example storing sub blocks 600.12001-600.12400 on storage element 300.16 and storing sub blocks 600.12401-12800 on storage element 300.16. It is clear that this would still allow for the storage system 1 to cope with f=6 concurrent failures of storage elements 300. Alternative methods for determining the share of sub blocks to be stored on specific storage elements 300 are well known to the person skilled in the art and are for example described in WO2009135630.

It is clear that according to alternative embodiments of the invention other values could have been chosen for the parameters x, f, k, n=k+f and r=k/n mentioned in embodiment above, such as for example x=400, f=4, k=12; n=k+f=12+4=16 and r=12/16; or any other possible combination that conforms to a desired reliability policy for redundancy and concurrent failure tolerance of storage elements 300 of the distributed object storage system 1.

According to still a further alternative there could be provided a safety margin to the number of concurrent failures f that a distributed object storage system 1 needs to be able to cope with. In such an embodiment some of the efficiency is traded in for some additional redundancy over what is theoretically required. This preventively increases the tolerance for failures and the time window that is available for a repair activity. However according to a preferred embodiment this safety margin will be rather limited such that it only accounts for an increase in sub blocks that must be generated and stored of for example approximately 10% to 30%, such as for example 20%.

Figure 6:
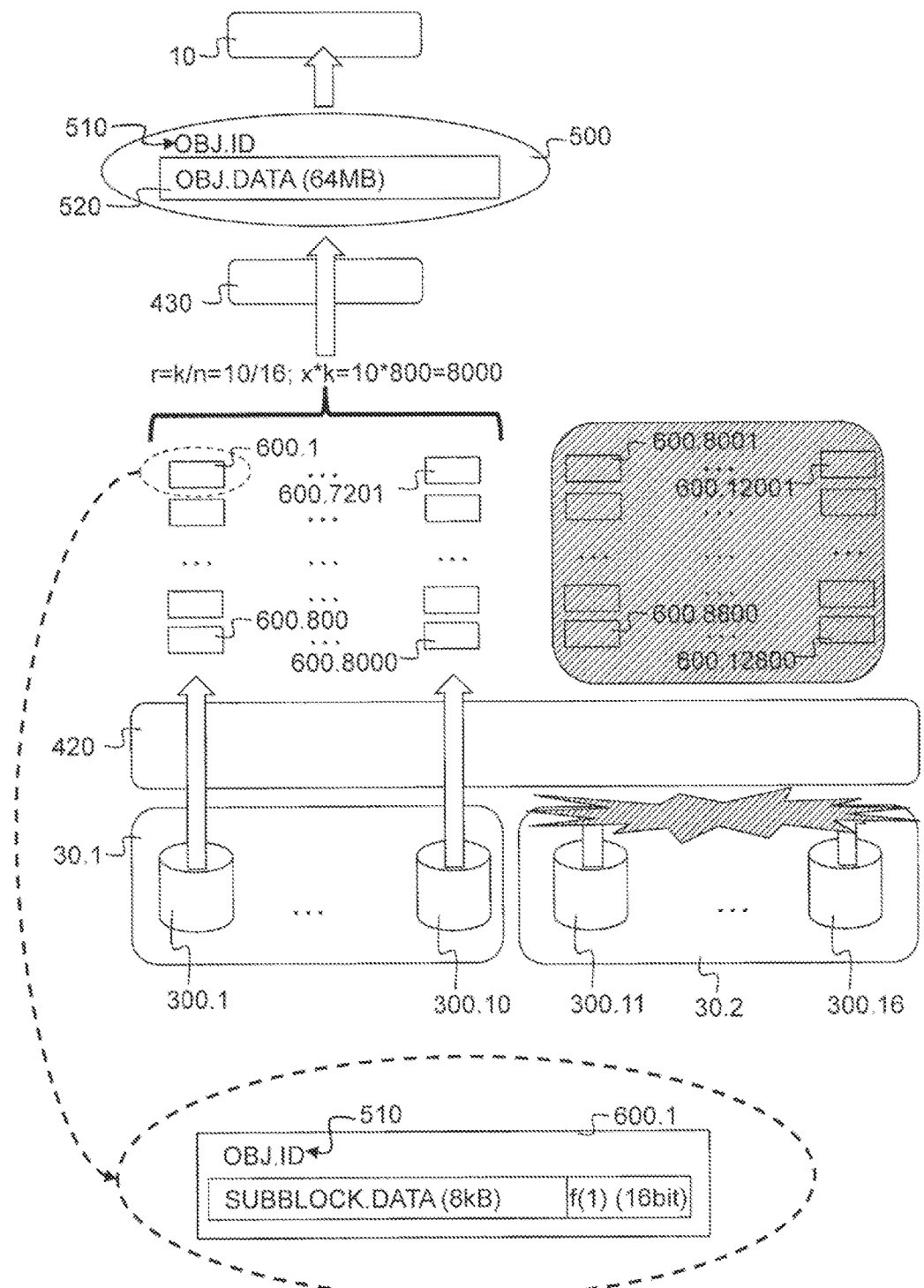
FIG. 6 schematically illustrates a retrieval operation according to the first option.

FIG. 6 shows the corresponding retrieval operation according to this first storage and retrieval option performed by the embodiment of the distributed object storage system 1 as described for the storage operation of FIG. 5 that is able to tolerate six concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 420 of the controller node 20 will initiate the retrieval of the sub blocks 600 associated with this data object identifier. It will try to retrieve the predetermined number x*n=16*800=12800 of redundant sub blocks 600.1-600.12800 that were stored on the storage elements 300.1-300.16. Because of the encoding technology used and the corresponding decoding techniques available, it is sufficient for the clustering module 420, to retrieve said predetermined multiple of said minimal spreading requirement x*k=800*10=8000 of said redundant sub blocks 600 from these storage elements 300.1-300.16. This could be the case when for example there is a problem in network connectivity between the controller node 20 and storage node 30.2 as indicated in FIG. 6. In that case the retrieval operation of the clustering module will be able to retrieve the sub blocks 600.1-600.8000 which corresponds to said predetermined multiple of said minimal spreading requirement x*k=800*10=8000. The retrieved sub blocks 600.1-600.8000 allow the decoding module 430 to assemble data object 500 and offer it to the application 10. It is clear that any number in any combination of the redundant sub blocks 600 corresponding to said data object 500, as long as their number is equal to or larger than the predetermined multiple of the minimal spreading requirement x*k=800*10=8000, would have enabled the decoding module 430 to assemble the data object 500.

Figure 7:
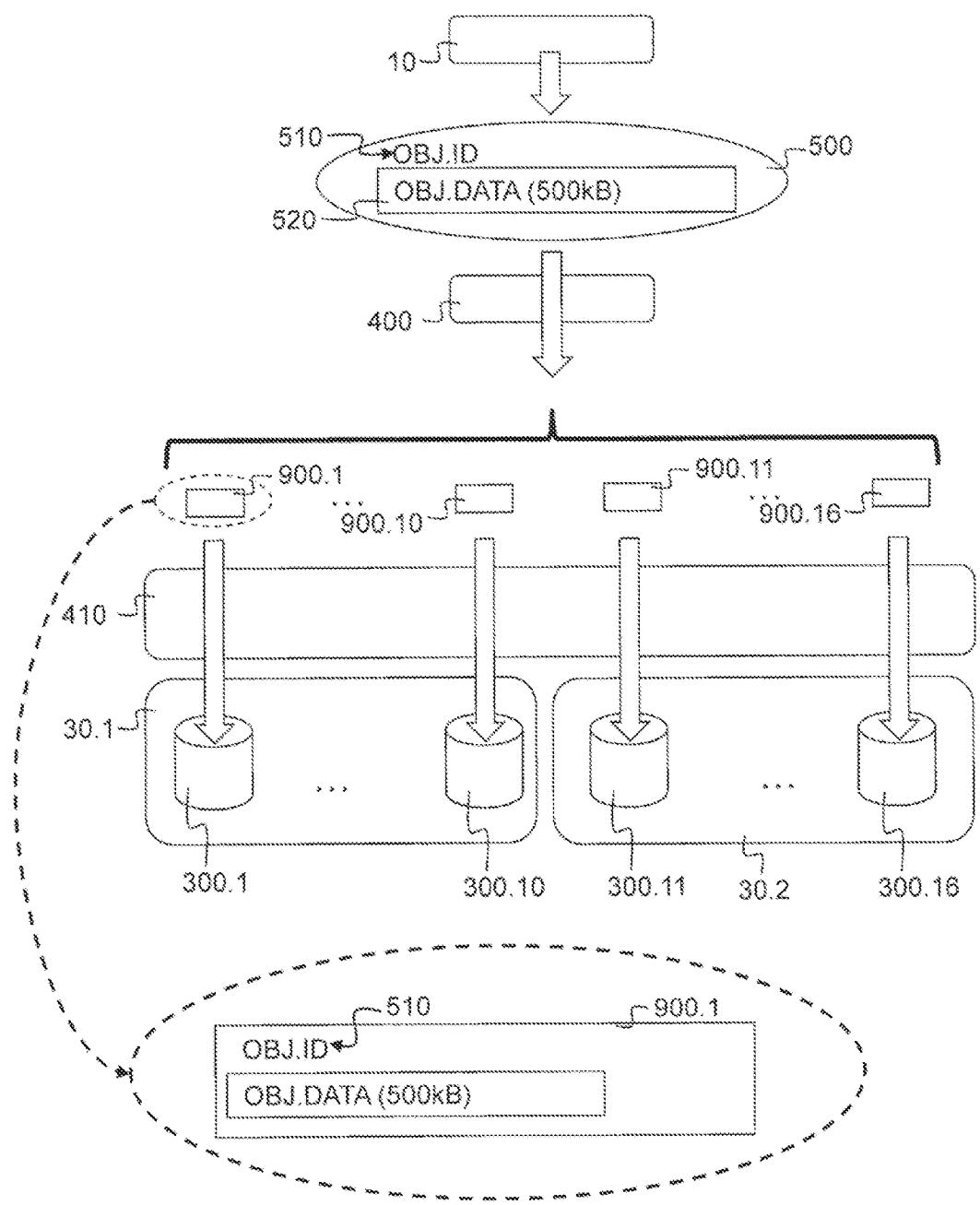
FIG. 7 schematically illustrates a storage operation according to the second option.
Figure 8:
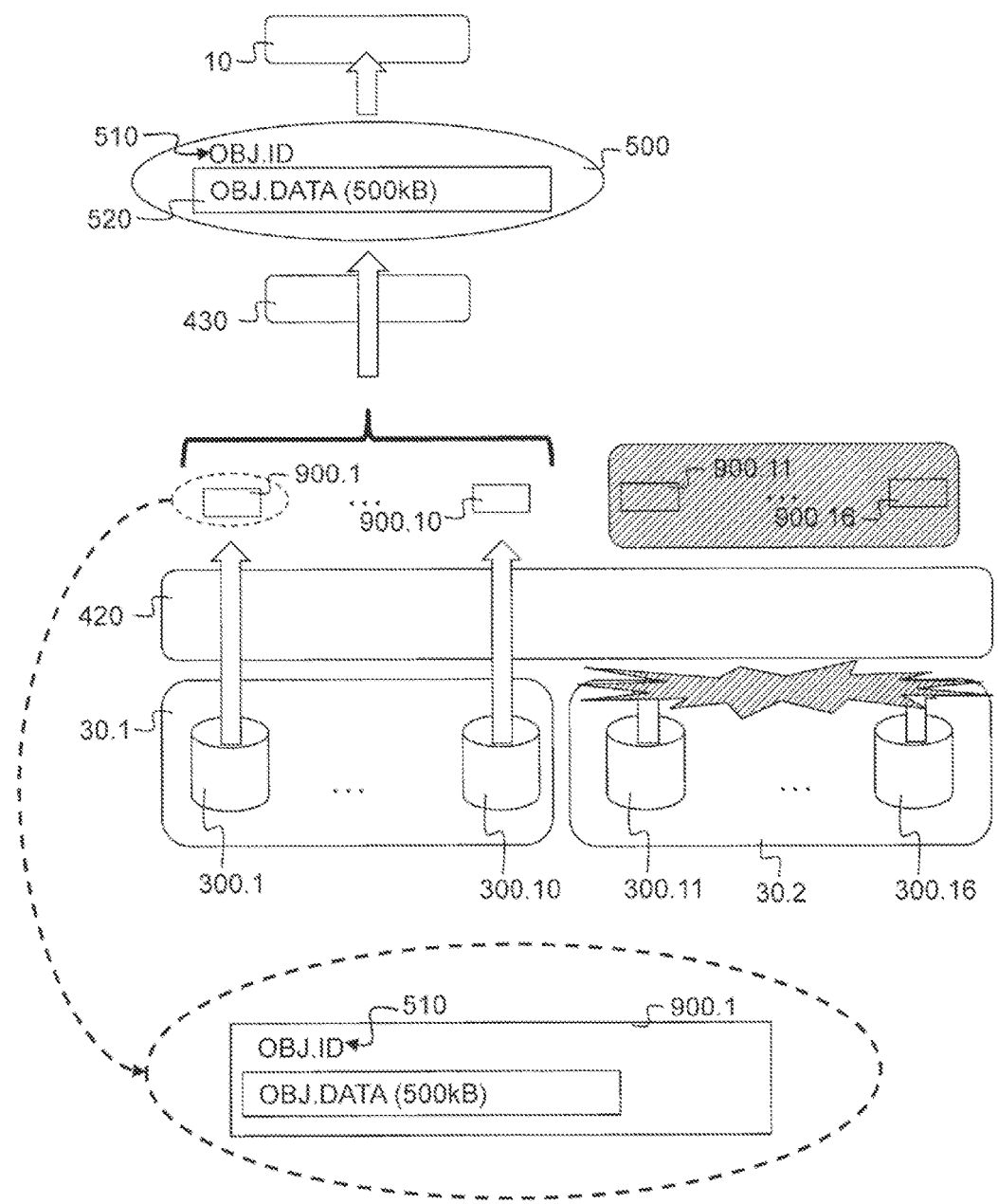
FIG. 8 schematically illustrates a retrieval operation according to the second option.

The first storage and retrieval option as described above is optimal for storing large data objects such as for example multimedia files containing audio and/or video content, which have a size of several Megabytes up to several Gigabytes. However when applying this distributed encoding and decoding scheme to smaller data objects, especially when a large number of these smaller data objects needs to be stored or retrieved, there exists the risk that, when they are stored according to the first storage and retrieval option the encoding and decoding process will introduce a large computational overhead of which the latency will start to outweigh the advantages with respect to storage cost when compared to replication. Furthermore also the decoding data f(1)-f(12800) will start to have an impact on the storage cost. If for example the decoding data would require 16 bit as explained above for every sub block 600, then this would amount to about 49600 Bytes for the embodiment described above with x*n=16*800=12800 sub blocks 600. If the data object 500 to be stored is smaller than 1 or 2 Megabytes, for example 500 kB, then this additional storage cost of about 50 kB can no longer be neglected. In alternative embodiments where the decoding data requires for example 20 Bytes, generating 12800 sub blocks 600 would mean an additional storage cost of about 256 kB, which in the case of a 500 kB data object 500 cannot be neglected. Therefor as shown in FIG. 7 the distributed object storage system 1 according to the invention is operated according to the first storage and retrieval option described above only if the size of the data object 500 is equal to or larger than a predetermined lower data object size threshold. This predetermined lower data object size threshold is for example 2 Megabyte or lower, preferably 1 Megabyte. If the size of the data object 500 is smaller than this predetermined lower data object size threshold then the distributed object storage system 1 according to the invention is automatically operated according to a second storage and retrieval option which is illustrated in FIGS. 7 and 8 for the embodiment of the distributed object storage system 1 shown in FIGS. 5 and 6. The storage operation of a data object 500 of 500 kB, which is smaller than the predetermined data object size threshold of for example 1 MB according to the second storage and retrieval option. It will be clear from FIGS. 5 and 6 that the plurality of redundant storage elements 300.1-300.16 according to the invention are also capable of storing and retrieving the data object 500 identified by its data object identifier 510 in the form of a predetermined plurality of replication copies 900.1-900.16 of this data object 510, which are also identifiable by means of this data object identifier 510 during a storage and retrieval operation. In order to fulfil the requirements of the redundancy policy as described above, the number of replication copies 900.1-900.16 generated corresponds to the desired spreading width, which according to this embodiment of the invention was n=16. As such the encoding module 400 will generate n=16 of these replication copies 900.1-900.16, each comprising an exact copy of the data object 500, which are subsequently offered to the spreading module 410 which subsequently stores them a corresponding number n=16 of storage elements 300.1-300.16. The computational overhead for the encoding module 400 is much lower than in the first storage and retrieval option, because no calculations needs to be performed in order to encode the data object 500 into a plurality of sub blocks 60. The only operation to be performed by the encoding module is to instruct the spreading module 410 to store a required number of replication copies 900 of the data object 500 on the storage elements 300. Therefor the latency for storing these smaller data objects 500 is considerably lower during a storage operation. In this way the distributed object storage system 1 enables a storage operation with an optimal level of responsiveness when processing small data objects 500 by means of replication, while limiting the impact on the storage cost of the overall system by using a redundant encoding scheme for larger data objects 500.

FIG. 8 shows the corresponding retrieval operation according to this second storage and retrieval option performed by the embodiment of the distributed object storage system 1 as described for the storage operation of FIG. 7 that is able to tolerate six concurrent failures of a storage element 300. The data object 500 is requested from the distributed object storage system 1 by the application 10 requesting a retrieval operation of the requested data object 500 which can be addressed by its object identifier 510. In response to this request for a retrieval operation the clustering module 420 of the controller node 20 will initiate the retrieval of the replication copies 900 associated with this data object identifier 510. It will try to retrieve at least one of the replication copies 900.1-900.16 that were stored on the storage elements 300.1-300.16. Because in this case replication was used, it is sufficient for the clustering module 420, to retrieve at least one of said replication copies 900.1-900.16 from these storage elements 300.1-300.16. As explained above with reference to FIG. 6, there could be a problem in network connectivity between the controller node 20 and storage node 30.2 as indicated in FIG. 8. In that case the retrieval operation of the clustering module 420 will be able to retrieve at least one of the replication copies 900.1-900.10. Optionally, the clustering module 420 will to retrieve a replication copy with a certain preference for a specific storage element 300, such as for example the geographically closest storage element or the most responsive storage element 300. The retrieved replication copy 900 will allow the decoding module 430 to provide the data object 500 and offer it to the application 10 with a very low computational overhead as no decoding operation is required.

According to a preferred embodiment of the distributed object storage system 1, each of the storage elements 300 comprises a distributed key value store in which the replication copies 900 are stored. This is advantageous as such a distributed key value store is also suited to store metadata for the data objects 500 stored in the distributed object storage system 1 in order to allow for efficient storage and retrieval of the data object. During a storage operation the encoding module 400 and/or the spreading module 410 add for every data object 500 they store a respective entry for its data object identifier, which can subsequently be consulted by the clustering module 420 and/or the decoding module 430 during a retrieval operation. Furthermore, because the distributed key value store is distributed over the storage elements 300 and it preferably stores metadata for the data objects 500 stored on the respective storage element 300, in this way the metadata is stored according to the same reliability policy as the corresponding data object 500. According to an embodiment this metadata could for example comprise for each data object 500 stored on the storage element 300 its data object identifier 510, a list of identifiers of the storage elements 300 on which sub blocks 600 or replication copies 900 of this data object 500 are stored and an identifier for the type of storage and retrieval option that was used to store said data object 500. In the particular case that the data object 500 is stored according to the second storage and retrieval option, this could then be supplemented by an entry which comprises the replication copy 900 itself.

Figure 9:
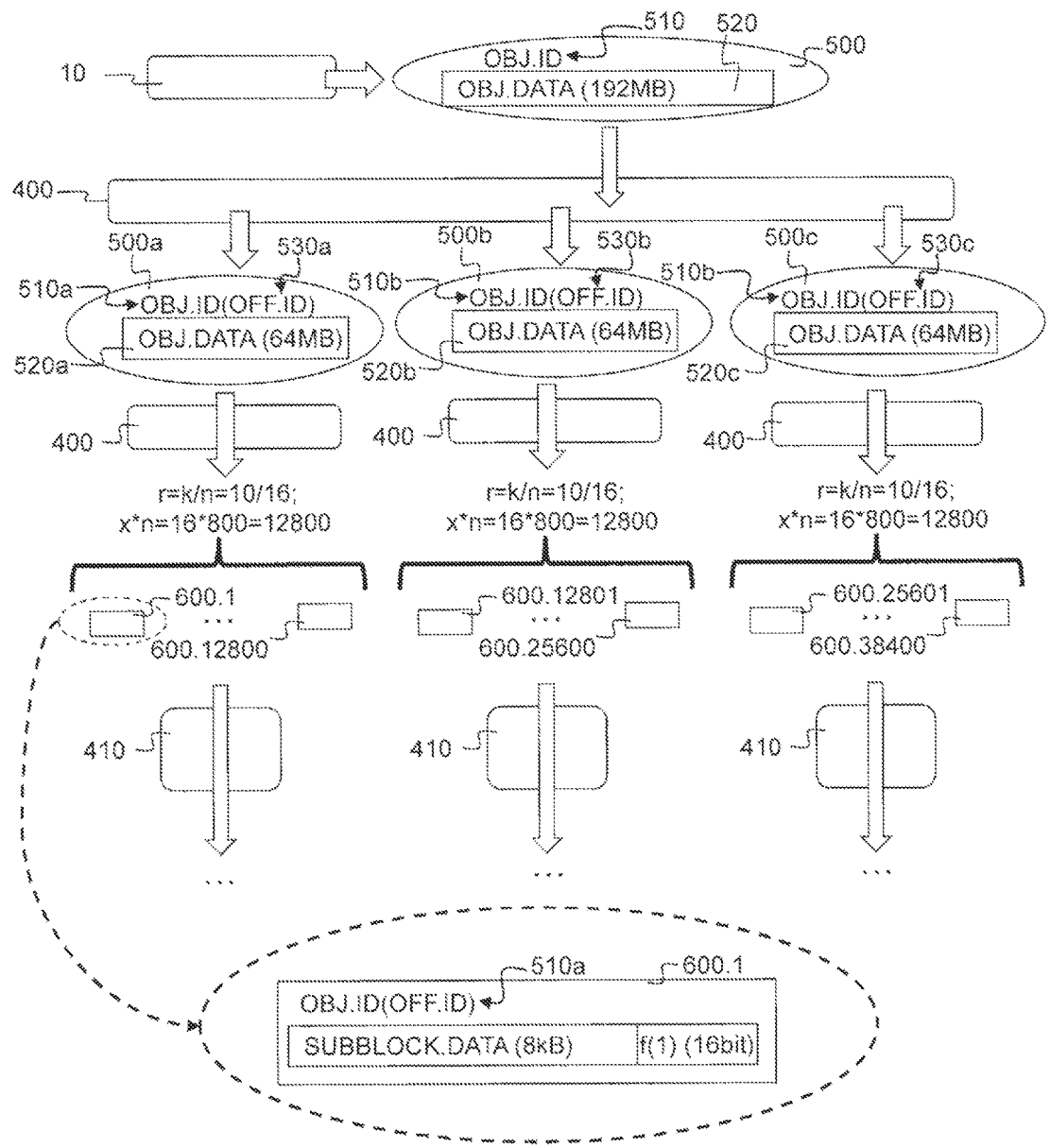
FIG. 9 schematically illustrates a storage operation according to the third option.

According to still a further embodiment as shown in FIG. 9 the distributed object storage system can further be operated according to a third storage and retrieval option in order to handle very large data objects 500 more efficiently. The distributed object storage system 1 will then be operated according to this third storage and retrieval option if the size of the data object 500 is larger than a predetermined upper data object size threshold. This upper data object size threshold could for example be equal to or larger than 8

Megabyte, preferably equal to or larger than 32 Megabyte, as such the upper data object size threshold could for example be 8 Megabyte, 16 Megabyte, 32 Megabyte, 64 Megabyte or 128 Megabyte, but could equally be for example 1 or 2 Gigabyte. Such data object 500 could for example be a digital version of a movie which comprises 6 GB of data. As shown in FIG. 9 the application 10 offers a data object 500 to encoding module 400, which comprises data 520 with a size of 192 MB. Now the encoding module 400 first splits this data object 500 into a plurality of sequential data objects 500*a*, 500*b* and 500*c*, in this particular case it concerns three sequential data objects 500*a*, 500*b* and 500*c* each comprising an sequential part of the data 520 of data object 500. This means that data object 500*a* comprises object data 520*a* which corresponds to the first 64 MB of the data 520 of data object 500, data object 500*b* comprises object data 520*b* that corresponds to the subsequent 64 MB of the data 520 of data object 500 and data object 500*c* comprises object data 520*c* that corresponds to the final 64 MB of the data 500 of data object 500. As such the sequence of the object data 520*a*, 520*b*, 520*c* of these data objects 500*a*, 500*b*, 500*c* corresponds to the data 520 of the data object 500.

Each of the sequential data objects 500*a*, 500*b* and 500*c* further comprises a data object identifier 510*a*, 510*b* and 510*c*. These data object identifiers 510*a*, 510*b*, 510*c* each comprise the data object identifier 510 of the data object 500 and a data object offset identifier 530*a*, 530*b*, 530*c*. The data object identifiers 510*a*, 510*b* and 510*c* in this way allow for identification by means of the data object identifier 510 of the data object 500 and also allow tracking of their sequential position by means of the data object offset identifiers 530*a*, 530*b* and 530*c*. According to a simple implementation data object identifier 510*a* could comprise the same GUID that forms the data object identifier 500 supplemented by a data object offset identifier 510*a* which is a suitable binary representation of the numerical value "0". The data object identifier 510*b* equally comprises as a data object identifier 510*b* the same GUID that forms the data object identifier 500, but is now supplemented by a data object offset identifier 510*b* which is a suitable binary representation of the numerical value "1" and similarly the data object offset identifier 510*c* will be a suitable binary representation of the numerical value "2". Alternatively the data object offset identifier could be any other suitable identifier that enable to identify the correct sequence of the sequential data objects 500*a*, 500*b* and 500*c*. As further shown in FIG. 9, each of said sequential data objects 500*a*, 500*b* and 500*c* is subsequently being stored according to the first storage option as for example shown in FIG. 5. This means that each of the sequential data object 500*a*, 500*b* and 500*c* is stored as an amount of encoded sub blocks 600 that are stored on a plurality of storage elements 300 as explained above. According to an advantageous embodiment shown in FIG. 9, each of the sequential objects 500*a*, 500*b* and 500*c* can be processed in parallel by a storage operation of the first type by means of their respective instance of the encoder module 400 and spreading module 410. In this way each of storage operation of the first type of the respective sequential data objects 500*a*, 500*b*, 500*c* progresses independent from the storage operation the other sequential data objects and as such the storage operation is more robust and allows to initiate already retrieval operations on some specific sequential data objects that were stored, without the necessity for all of the sequential data objects to be stored.

It will be clear to a person skilled in the art that a number of alternative policies are available for splitting the data object 500 into a number of sequential data objects. A preferred alternative is shown in the embodiment of FIG. 9, in which the data object 500 is split into an integer number of sequential data objects 500*a*, 500*b* and 500*c* with a predetermined size of 64 MB, of course other suitable sizes could be possible. In such a case when the data object 500 to be split is not an exact integer multiple of this predetermined size, the last of the sequential data objects could optionally be padded until it for example comprises a multiple of x*k=800*10=8000 Bytes. The fact that a large portion of the sequential data objects comprise a fixed size offers the additional advantage that this allows for optimizing for example memory allocation and low level algorithms during the encoding and decoding stage of the storage and retrieval operation of the first type. It is further also preferred to set the upper data object size threshold equal to this predetermined size of the sequential data objects, which according to the embodiment described above would be 64 MB. as then the first storage and retrieval option is particularly suited to store and retrieve these sequential data objects efficiently.

Figure 10:
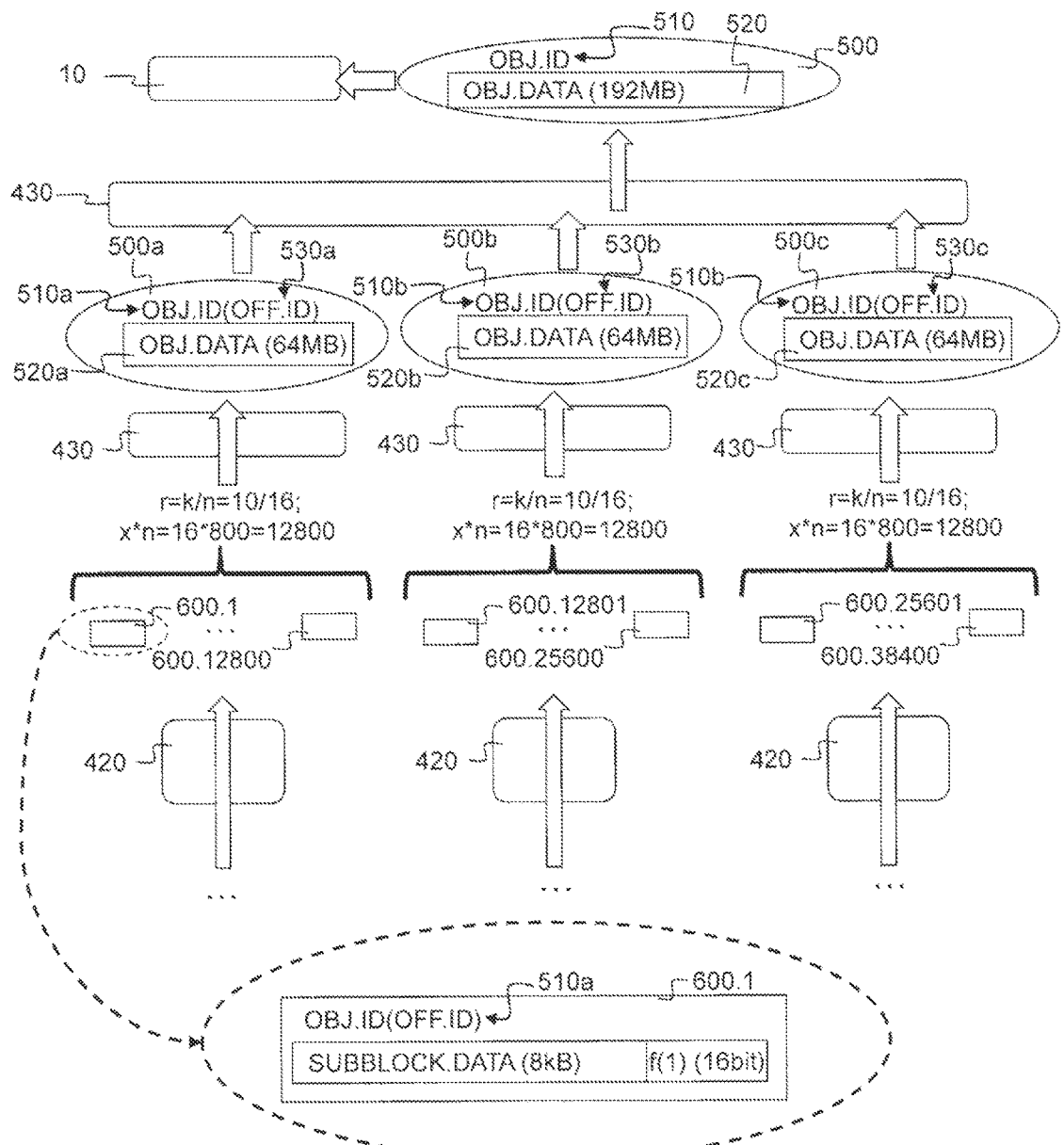
FIG. 10 schematically illustrates a retrieval operation according to the third option.

During the corresponding retrieval operation for retrieving the data object 500 stored during the storage operation according to the third storage and retrieval operation as shown in FIG. 10, the client 10 issues a retrieval request to the distributed object storage system 1. As explained above, in this embodiment the requested data object 500 can be addressed by its object identifier 510. In response to this request for a retrieval operation the clustering module 420 of the controller node 20 will initiate the retrieval of the sub blocks 600 associated with this data object identifier 510 as comprised within the data object identifiers 510*a*, 510*b* and 510*c* of the sequential data objects 500*a*, 500*b* and 500*c*. Preferably there will be provided an instance of the clustering module 420 for a plurality of these sequential data objects in parallel. The sequential data objects 500*a*, 500*b* and 500*c* are retrieved according to the first storage and retrieval option as described above. This means that for each of the sequential data objects the clustering module 420 will try to retrieve at least the predetermined multiple of the minimal spreading width x*k=800*10=8000 of the redundant sub blocks 600 that were stored on the storage elements 300. The retrieved sub blocks 600 allow the decoding module 430 to assemble the sequential data object 500*a*, 500*b* and 500*c*, preferably as shown in FIG. 10 each of the sequential data objects is decoded by a separate instance of the decoding module 430. Subsequently the decoding module will be able to assess the correct order of the sequential data objects 500*a*, 500*b* and 500*c* by means of their data object offset identifier 530*a*, 530*b* and 530*c*. This will allow the decoding module 430 to concatenate the sequential data objects 500*a*, 500*b*, 500*c* in the correct order such that they form the data object 500 which is subsequently offered to the application 10.

Although for the embodiment described in FIGS. 9 and 10 the upper data object size threshold has been chosen to be 64 MB, it can be chosen to be another convenient value, but in order to achieve notable beneficial effects it has been determined that it should be equal to or larger than 8 Megabyte, preferably equal to or larger than 32 Megabytes. As such the upper data object size threshold could for example be 8 Megabyte, 16 Megabyte, 32 Megabyte, 64 Megabyte or 128 Megabyte, but could equally be for example 1 or 2 Gigabyte.

According to a specifically advantageous embodiment of the distributed object storage system 1 as shown in FIGS. 9 and 10, it is possible to store and/or retrieve a specific selection of the sequential data objects 500*a*, 500*b* and 500*c*.

For example, during a retrieval operation of a data object 500 which represents a digital movie comprising data 520 of several GB. The application 10, which for example displays the content of this movie on a suitable device, could request to retrieve a specific part of this movie, for example in order to start playback at a particular part of the movie or to playback a particular scene. In such a case the application 10 will provide, next to the data object identifier of the data object it wants to retrieve, an indicator for the specific section of the data it wants to retrieve to the distributed object storage system 1. This can for example be implemented by means of for example providing an offset and the size of the data section, for example in the case of the digital movie the application could be interested in a specific data section which starts at an offset of 1 GB and has a size of 256 MB. It is clear that the distributed object storage system 1 will be able to calculate which particular sequential data objects hold the requested data section and is able to initiate a specific retrieval operation for this selection of sequential data objects by means of their data object offset identifier. Similarly also during a storage operation it is sometimes beneficial to store only a specific data section, for example if only a specific part of the data of a data object was updated, the distributed object storage system 1 will only need to update the corresponding sequential data objects, which can be selected by means of their data object offset identifier.

Figure 11:
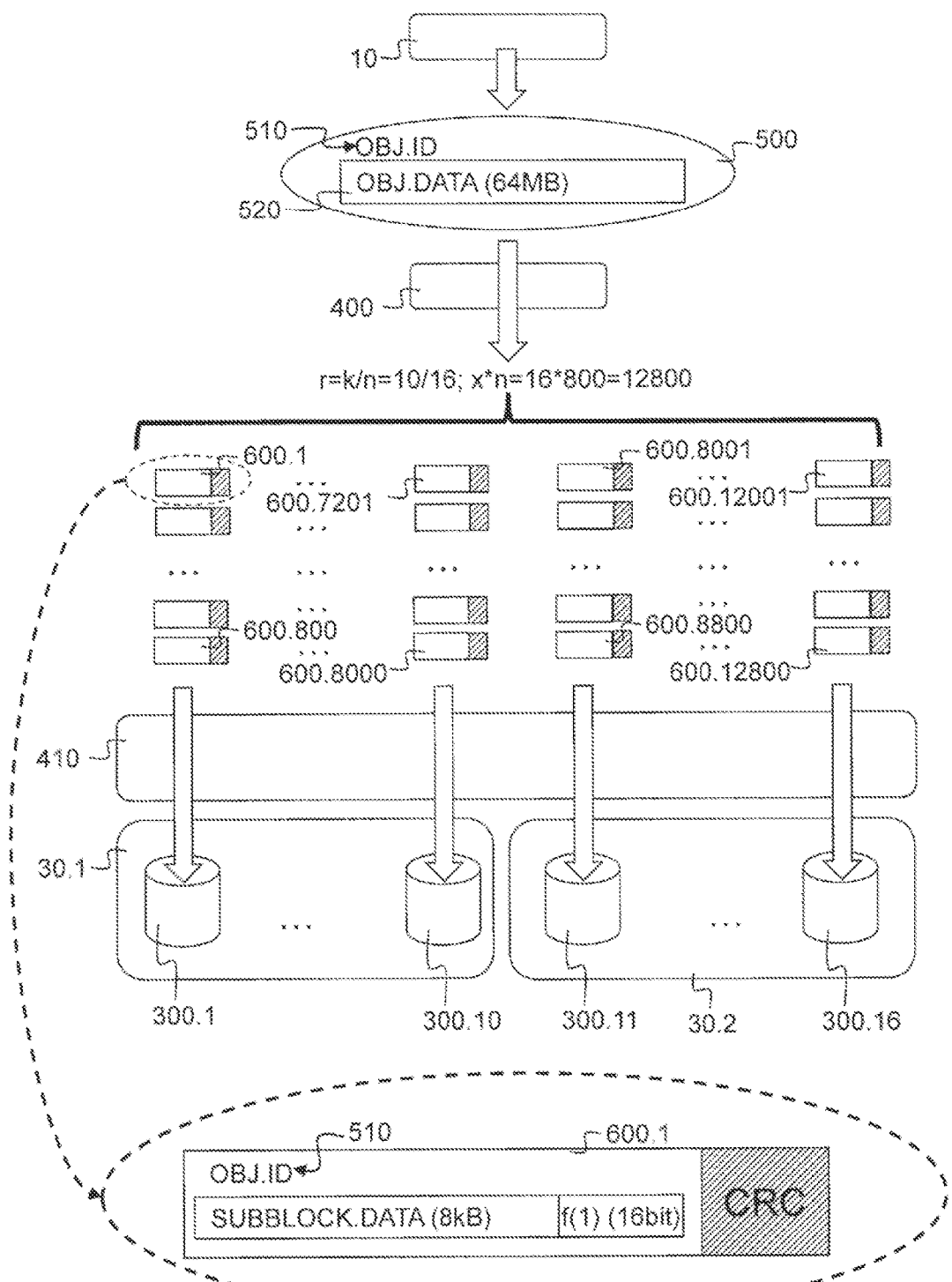
FIG. 11-15 schematically illustrate several embodiments for optimized CRC calculation during storage and retrieval operations according to the invention.
Figure 12:
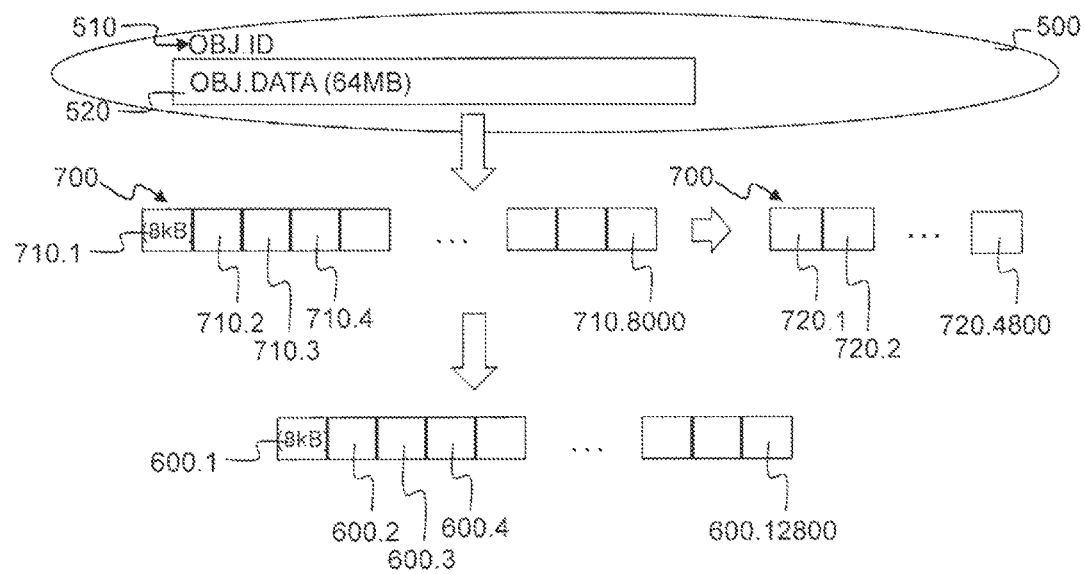

According to a further embodiment of the distributed object storage system 1 as shown in FIG. 11 the encoding module will 400 will generate a Cyclic Redundancy Check also referred to as CRC for each of the sub blocks 600. As such there will now be available a predetermined number of sub blocks 600 and a predetermined number of CRCs of these sub blocks 600. The spreading module 410 subsequently stores this predetermined number of CRCs together with their corresponding redundant sub blocks 600 on the storage elements 300. These CRCs now allow to assess data consistency of the sub blocks 600 stored in the distributed object storage system. It is clear that during the encoding operation a lot of CRCs will need to be calculated and that during a subsequent decoding operation a lot of CRCs will need to be verified. Further adding to this, as for example shown in FIG. 12 and described in WO2009/135630, is that during the encoding process sub blocks 600 are generated on the basis of intermediate data blocks 700, each of which is preferably provided with a CRC during the encoding process itself in order to verify these intermediate data blocks for data consistency. According to a preferred embodiment of the distributed object storage system 1 the encoding and decoding operation during a storage and retrieval operation of the first type can be performed more efficiently, especially with regard to the aspect of the generation and verification of CRCs. According to this embodiment the encoding module 400 is operable to calculate the redundant sub blocks 600 by means of a predetermined combination of XOR operations on intermediate data blocks 700. This is shown in more detail in FIG. 11, where in Step 1 the data 520 of the data object 500 of for example 64 MB is split into $x*k=800*10=8000$ first level intermediate data blocks 710 by the encoding module 400 by splitting the data object 500 into $x*k=800*10=8000$ parts of 8 kB. Optionally if the data 520 can be padded until it comprises a multiple of $x*k=800*10=8000$ Bytes. For each of these first level intermediate data blocks 710.1-710.8000 a corresponding CRC is calculated by the encoding module. In Step 2 $x*f=800*6=4800$ equally sized second level intermediate data blocks 720.1-720.4800 are calculated by means of suitable XOR operation of one or more first level intermediate data blocks 710. Intermediate data block 720.1 could for example be the XOR operation of intermediate data block 710.1 and 710.5. Also for these second level intermediate data blocks the encoding module will generated a corresponding CRC. The first level and second level intermediate data blocks 710 and 720 in this way form already a set of the predetermined number $x*n=800*16=12800$ intermediate data blocks 700 with a size of 8 kB. Subsequently in Step 3 the encoding module 400 will generate sub blocks 600.1-600.12800 by applying suitable XOR operations on the intermediate data blocks 700 generated in the previous steps. Sub blok 600.1 could for example be generated by an XOR operation of intermediate data block 710.2 and 710.10 and 720.3. As indicated above also for these sub blocks 600 the encoding module 400 generates a corresponding CRC. The way in which these XOR operations are to be performed on the intermediate data blocks 700 in order to generate suitable sub blocks 600 are well known to the person skilled in the art which is aware of erasure encoding and decoding implementations. As such each sub block 600 can be seen as the result of a combination of XOR operations performed on a plurality of intermediate data blocks 700. In prior art systems the encoder module will calculate the CRC of the sub blocks 600 on the basis of the data they comprise. According to this preferred embodiment of the invention however the CRC of a sub block 600 can be calculated without processing the data of the sub block 600. This is can be accomplished as the intermediate data blocks 700 all have the same size, 8 kB in this example, and then there is known that the CRC of the result of an XOR operation on a plurality of these intermediate data blocks 700 will be equal to the result of that same XOR operation applied to the CRCs of these intermediate data blocks 700. It is clear that the XOR operation on the CRCs of the intermediate data blocks 700 can be executed far more efficiently then the calculation of the CRC based on the data of a sub block 600 as less data is to be processed and less calculations are to be performed. Therefor according to this embodiment the encoding module 400 will calculate the CRC a redundant sub block 600 by applying the predetermined combination of XOR operations to the respective CRCs of the intermediate data blocks 700, that corresponds to the predetermined combination of XOR operations that was performed on these intermediate data blocks 700 in order to generate the sub block 600. The same could also be applied to the calculation of the CRCs for the second level intermediate data block 720, which could also be calculated by applying the predetermined combination of XOR operations to the respective CRCs of the first level intermediate data blocks 710 which were used to generate this second level data block 720. As such the only CRCs that need to be calculated based on the data itself are the CRCs of the first level intermediate data blocks 710, all other CRCs can be calculated on the basis of other CRCs. Optionally the XOR operations can be further optimised by prepending or appending the CRC to the intermediate data blocks 700 during the XOR operations performed thereon. In this way the CRCs can be calculated making use of the same XOR operation that is performed on these intermediate data blocks 700 during the encoding process.

Figure 13:
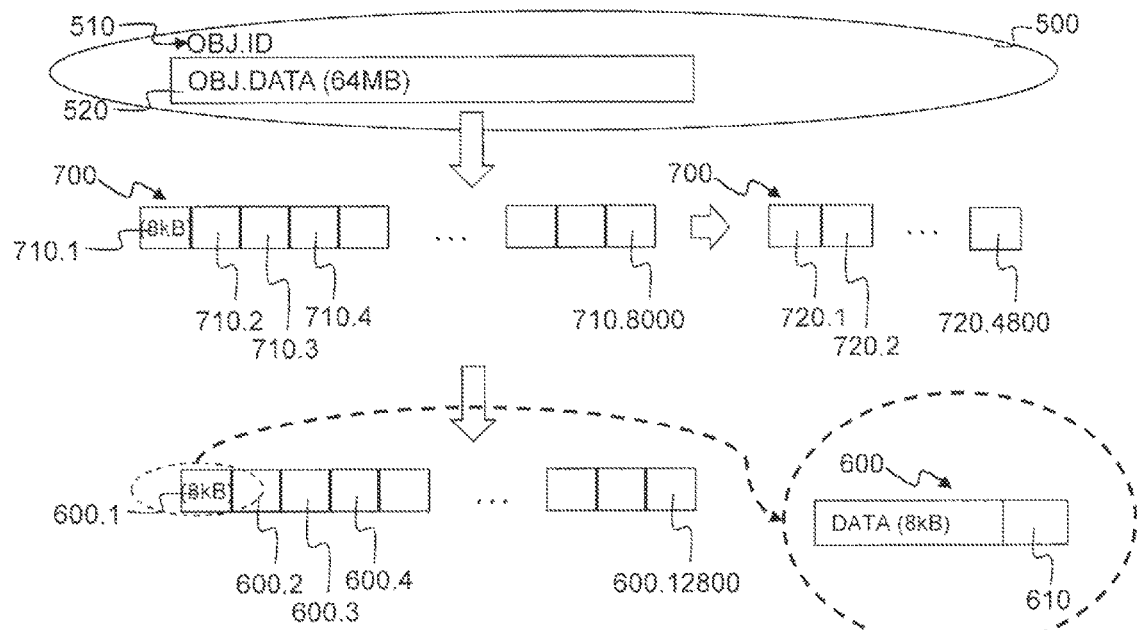

As known from for example "Everything we know about CRC but afraid to forget", Andrew Kadatch, Bob Jenkins, Sep. 3, 2010, the CRC of a concatenated data block which is the concatenation of two data blocks for which the CRC is available can be efficiently calculated without accessing the contents of the concatenated data block. For the sake of brevity we will refer to such functionality as a concatenated CRC generator. Therefore, according to a further embodiment as shown in FIG. 13, similar to that of FIG. 12, with the addition of the fact that the sub blocks 600 now are supplemented with a header 610 which for example comprises for example the data object identifier 510, decoding data f(i), other suitable identifiers and/or status information. The sub block 600 as such is a concatenation of the header 610 and the 8 kB of data of the sub block 600 that is calculated by means of XOR operations on the intermediate data blocks 700 as explained above. The CRC of the header, which often has a limited size of for example 16 bits to about 32 bytes can be calculated efficiently on the basis of its data. The CRC of the 8 kB of data can be calculated efficiently from the CRCs of the intermediate data blocks 700 as explained above. The CRC from the entire sub block 600 can then subsequently be calculated from the CRC of the header 610 and the CRC of the 8 kB of data by means of the concatenated CRC generator.

Figure 14:
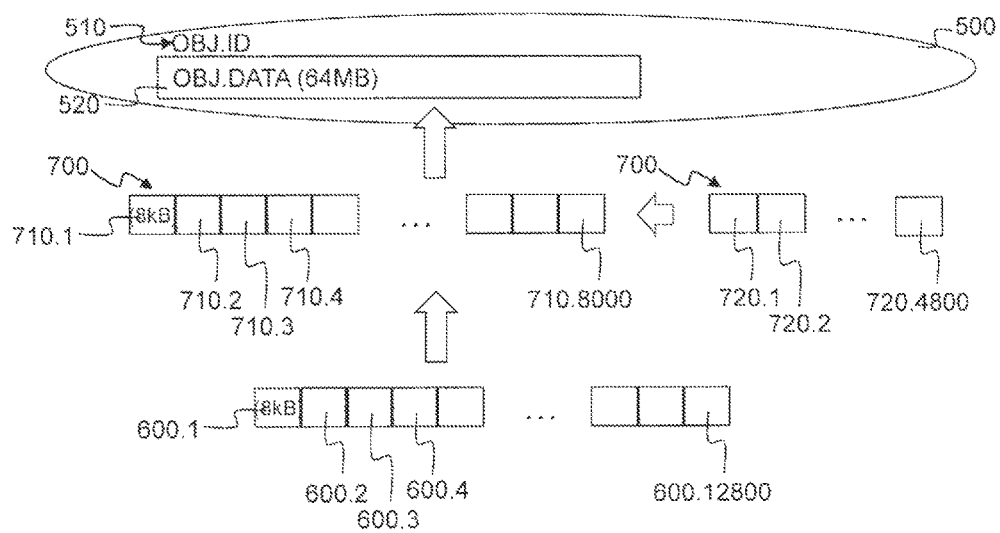

According to still a further embodiment of the distributed object storage system 1 the invention as shown in FIG. 14, the processing of CRCs during a retrieval operation according to the first storage and retrieval option is also optimized using these concepts. As explained above during such a retrieval operation the clustering module 420 will retrieve the required sub blocks 600 from the storage elements 300. Along with these sub blocks 600 it will further also retrieve the respective CRCs of these redundant sub blocks 600. Subsequently the decoding module 430, as explained above, will assemble the data object 500 from a sufficient number of redundant sub blocks 600. As will be clear to a person skilled in the art when the XOR based erasure encoding scheme was used for encoding the data object 500 then there are available similar XOR based decoding schemes for decoding the data object 500 from these sub blocks 600. The way in which these XOR operations are to be performed on the sub blocks 600 in order to generate suitable intermediate data blocks 700 are well known to the person skilled in the art which is aware of erasure encoding and decoding implementations. As explained above with reference to the encoding operation the decoding module 430 will be able to calculate the CRCs of the intermediate data blocks 700 from the CRCs of the sub blocks 600 by applying this predetermined combination of XOR operations to the respective CRCs of the redundant sub blocks 600.

As further shown in FIG. 14 the decoding module forms the data object 500 retrieved according to the first storage and retrieval option from a concatenation of a plurality of these intermediate data blocks 700. As such the decoding module 430 will be able to efficiently calculate the CRC of said data object 500 from the CRCs of these respective intermediate data blocks 700 by means of the concatenated CRC generator as explained above. The processing of the CRCs by means of the concatenated CRC generator can proceed in a linear fashion, this means that the concatenated CRC generator first processes the CRC for the concatenation of the first and second intermediate data block and subsequently processes this CRC with the CRC of the third intermediate data block in the sequence in order to calculate the CRC of the sequence of the concatenation of the first, second and third intermediate data block, and so on until the CRC of the concatenation of all intermediate data blocks forming the data 520 of the data object 500 is calculated. Alternatively the calculation could also be performed in a parallel way, this means that in a plurality of parallel instances of the concatenated CRC generator, for example first the CRC is calculated for the concatenation of the first and second intermediate data block and in parallel the CRC is calculated for the concatenation of the third and fourth intermediate data block, subsequently the CRC for the concatenation of the first to the fourth intermediate data block based on the CRCs calculated in the previous step and so on until the CRC for the concatenation of all intermediate data blocks which form the data 520 of the data object 500 is calculated.

Figure 15:
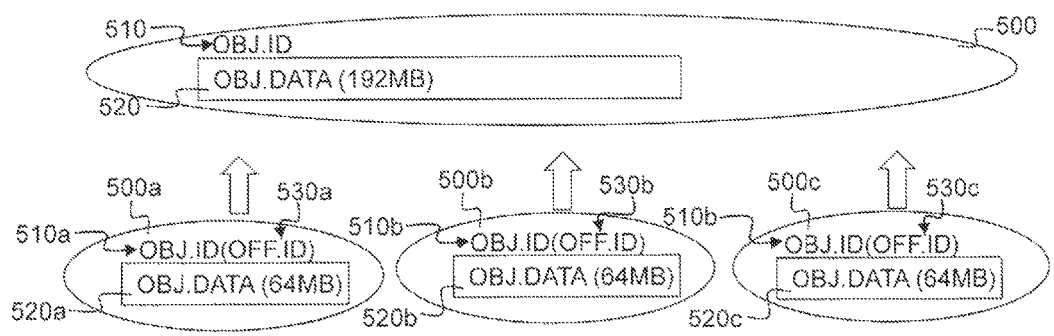

According to a further alternative embodiment as shown in FIG. 15, when a plurality of sequential data objects 500a, 500b, 500c have been retrieved according to the first storage and retrieval option in order to assemble a data object 500 according to the third storage and retrieval option. The decoding module 430 is able to calculate the CRCs of the sequential data objects as described above with reference to FIG. 14. The decoding module 430 is then subsequently able to calculate the CRC this data object 500 from the respective CRCs of the plurality of sequential data objects 500a, 500b, 500c by means of the concatenated CRC generator.

According to still a further embodiment it is possible, as for example described in "Everything we know about CRC but afraid to forget", Andrew Kadatch, Bob Jenkins, Sep. 3, 2010, to calculate the CRC of a message of which a part has been modified from the CRC of the original message efficiently. As such if for example one or more of the sequential data objects 500a, 500b, 500c constituting a data object 500 are updated, or if one or more of the intermediate data blocks 700 for forming the data object 500 are updated the CRC of the update data object 500 can be calculated by means of the CRC of the data object 500 before the update as indicated above. According to a further alternative the CRC can be calculated by using the concatenated CRC generator in a linear or parallel fashion on the CRCs of the updated regions and the CRCs of the regions which have remained unchanged.

According to still a further advantageous embodiment in the case of the first storage and retrieval option the CRC of the data object 500 could be calculated directly from the CRCs of the intermediate data blocks 700 or the CRCs of the sub blocks 600. The CRC of this data object 500 can then be checked in order to detect if there is any data corruption. If data corruption is detected then in a second phase the more intense process of checking the CRCs of the sub blocks 600 or the intermediate data blocks 700 is initiated. The corrupt sub blocks 600 are eliminated, replaced by new sub blocks 600 or the intermediate data blocks 700 and the aforementioned retrieval operation is repeated.

According to still a further aspect of the invention the concepts of the distributed object storage system can be applied to provide for sufficient redundancy when making use of a storage medium which is inherently unreliable. Such an apparatus is suitable to store and retrieve on such a storage medium a data object 500 in the form of a predetermined number of redundant sub blocks 600 as explained with reference to the distributed object storage system. In this case the minimal spreading requirement will when multiplied with the predetermined multiple correspond to the minimal number of sub blocks 600 that are not allowed to fail. The maximal concurrent failures tolerance will, when multiplied with the predetermined multiple, correspond to the number of sub blocks 600 of said data object 500 which are allowed to fail concurrently. The encoding module 400 and decoding module 430 will operate as described above with reference to the distributed object storage system. The spreading module 410 will to store the predetermined number of redundant sub blocks 600 on the storage medium and the clustering module 420 will be configured to retrieve at least the predetermined multiple of said minimal spreading requirement of the redundant sub blocks (600) from said storage medium.

According to a further embodiment Instead of spreading the data objects 500 in encoded form amongst a plurality of storage elements they are spread amongst a plurality of specific sections of the storage medium. The storage medium will for this purpose be segmented in to a plurality of different sections. If the storage medium is for example a 16 GB Flash drive and the desired spreading width n=16, then the storage medium can be segmented in for example at least n=16 different sections of 1 GB. The spreading module 410 will then store the predetermined number of redundant sub blocks 600 on a number of these sections of said storage medium being larger or equal to said desired spreading width n=16. The clustering module 420 will in this case further be able to retrieve at least said predetermined multiple of said minimal spreading requirement x*k=800*10=8000 of redundant sub blocks 600 these sections of said storage medium.

Such storage media could for example be a flash drive which is prone to cell failures after a predetermined number of read or write cycles. But also other storage media such as a magnetic storage medium, such as a magnetic tape or disk drive, an optical storage medium, such as cd or dvd, a holographic storage medium; or a quantum information storage medium exhibit unreliable behaviour because of some inherent instability of the basic elements of their storage technology. In order to cope with this inherent instability said apparatus comprises a distributed object storage system 1 which executes a storage and retrieval operation of the first type as described above on the virtual storage elements.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. This is especially the case for the exemplary mentioning of all the sizes of data and numbers that have been described as parameters, they can easily be adapted to other suitable values and have only been mentioned in order to improve the clarity of the examples. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. A distributed storage system, comprising:
   a plurality of storage elements; and
   control circuitry configured to:
   receive a data item, via a communication network, from a device that requests storage of the data item;
   determine a size of the data item;
   in response to determining that the size of the data item is less than a first predetermined threshold:
   generate replicas of the data item as redundant data elements in accordance with a spreading parameter;
   in response to determining that the size of the data item is greater than or equal to the first predetermined threshold and less than a second predetermined threshold:
   divide the data item into data blocks based on the spreading parameter; and
   append encoding information to each of the data blocks to generate redundant data elements;
   in response to determining that the size of the data item is greater than or equal to the second predetermined threshold:
   divide the data item into a plurality of sections of predetermined length;
   divide each section into data blocks based on the spreading parameter; and
   append encoding information to each of the data blocks of each section to generate redundant data elements; and
   store the redundant data elements among the plurality of storage elements.

2. The distributed storage system of claim 1, wherein the encoding information is generated by processing the data blocks with an erasure coding algorithm.

3. The distributed storage system of claim 1, wherein the control circuitry is further configured to, in response to determining that the size of the data item is greater than or equal to the second predetermined threshold, append a unique identifier of the data item and an identifier offset to each of the plurality of sections to identify each of the plurality of sections as corresponding to the data item.

4. The distributed storage system of claim 3, wherein the control circuitry is further configured to retrieve one of the plurality of sections that has a unique identifier and an identifier offset matching a unique identifier and an identifier offset included in a retrieval request from the device.

5. The distributed storage system of claim 1, wherein the control circuitry is further configured to, in response to determining that the size of the data item is greater than or equal to the second predetermined threshold, pad a last section of the plurality of sections when a length of the last section is less than the predetermined length.

6. The distributed storage system of claim 1, wherein the control circuitry is further configured to append a cyclic redundancy check (CRC) code to each of the redundant data elements.

7. The distributed storage system of claim 6, wherein the control circuitry is further configured to generate the CRC code by:

dividing the data item into intermediate blocks; and
performing exclusive-OR operations on the intermediate blocks.

8. The distributed storage system of claim 1, wherein:
the control circuitry is further configured to generate a distributed key for each of the plurality of storage elements;
the distributed key identifies redundant data elements stored in the plurality of storage elements; and
the distributed key is distributed among the plurality of storage elements.

9. The distributed storage system of claim 1, wherein the control circuitry is further configured to retrieve at least one replica of the data item from the plurality of storage elements upon receipt of a retrieval request from the device.

10. The distributed storage system of claim 9, wherein:
at least a portion of the plurality of storage elements are distributed in different geographical areas; and
the control circuitry is further configured to retrieve the at least one replica from a storage element geographically located closest to the device.

11. The distributed storage system of claim 1, wherein:
the control circuitry is further configured to retrieve a minimum number of redundant data elements from at least a subset of the plurality of storage elements based on receipt of a retrieval request from the device; and
the minimum number corresponds to a minimum number of redundant data elements required for reconstruction of the data item and being a multiple of the spreading parameter.

12. The distributed storage system of claim 1, wherein the communication network is a wireless communication network.

13. The distributed storage system of claim 1, wherein:
the device is a wireless telephone, a computer or a personal digital assistant; and
the device executes an application to communicate with the distributed storage system.

14. The distributed storage system of claim 1, wherein the plurality of storage elements includes partitions in a single storage device.

15. The distributed storage system of claim 14, wherein the single storage device includes a solid state drive.

16. A method of storing a data item in a distributed storage system, comprising:
receiving, with control circuitry, the data item from a device via a communication network, the device requesting storage of the data item;
determining, with the control circuitry, a size of the data item;
in response to determining that the size of the data item is less than a first predetermined threshold:
generating, with the control circuitry, replicas of the data item as redundant data elements in accordance with a spreading parameter;
in response to determining that the size of the data item is greater than or equal to the first predetermined threshold and less than a second predetermined threshold:
dividing, by the control circuitry, the data item into data blocks based on the spreading parameter; and
appending, by the control circuitry, encoding information to each of the data blocks to generate redundant data elements;
in response to determining that the size of the data item is greater than or equal to the second predetermined threshold:
dividing, by the control circuitry, the data item into a plurality of sections of predetermined length;
dividing, by the control circuitry, each section into data blocks based on the spreading parameter; and
appending, by the control circuitry, encoding information to each of the data blocks of each section to generate redundant data elements; and
storing, by the control circuitry, the redundant data elements among a plurality of storage elements.

17. The method of claim 16, further comprising generating a distributed key for each of the plurality of storage elements, the distributed key identifying redundant data elements stored in the plurality of storage elements, the distributed key being distributed among the plurality of storage elements.

18. The method of claim 16, further comprising appending a unique identifier of the data item and an identifier offset to each of the plurality of sections to identify each of the plurality of sections as corresponding to the data item.

19. A distributed storage system, comprising:
means for receiving a data item, via a communication network, from a device that requests storage of the data item;
in response to the size of the data item being less than a first predetermined threshold, means for:
generating replicas of the data item as redundant data elements in accordance with a spreading parameter;
in response to the size of the data item being greater than or equal to the first predetermined threshold and less than a second predetermined threshold, means for:
dividing the data item into data blocks based on the spreading parameter; and
appending encoding information to each of the data blocks to generate redundant data elements;
in response to the size of the data item being greater than or equal to the second predetermined threshold, means for:
dividing the data item into a plurality of sections of predetermined length;
dividing each section into data blocks based on the spreading parameter; and
appending encoding information to each of the data blocks of each section to generate redundant data elements; and
means for storing a plurality of redundant data elements.

20. The distributed storage system of claim 19, further comprising means for appending a unique identifier of the data item and an identifier offset to each of the plurality of sections to identify each of the plurality of sections as corresponding to the data item.

* * * * *